United States Patent [19]
Mayer

[11] Patent Number: 6,076,760
[45] Date of Patent: Jun. 20, 2000

[54] CONTROL METHOD AND APPARATUS FOR A YARN WINDING MACHINE

[75] Inventor: Manfred Mayer, Remscheid, Germany

[73] Assignee: Barmag AG, Remscheid, Germany

[21] Appl. No.: 09/123,171

[22] Filed: Jul. 27, 1998

[30] Foreign Application Priority Data

Jul. 26, 1997 [DE] Germany ............... 197 32 220

[51] Int. Cl.[7] .................................................. B65H 54/22
[52] U.S. Cl. ............................................................ 242/474.5
[58] Field of Search ........................ 242/486.4, 474.5, 242/474.6, 486.8, 470

[56] References Cited

U.S. PATENT DOCUMENTS

| | | | |
|---|---|---|---|
| 3,231,208 | 1/1966 | Kaufmann | 242/486.8 X |
| 3,921,923 | 11/1975 | Kuno et al. | 242/474.6 |
| 4,371,122 | 2/1983 | Schuller | 242/486.8 X |
| 5,029,762 | 7/1991 | Behrens et al. | 242/474.5 |
| 5,100,072 | 3/1992 | Behrens et al. | 242/474.5 |
| 5,112,000 | 5/1992 | Derichs et al. | 242/486.4 |
| 5,775,610 | 7/1998 | Kudrus | 242/474.6 |
| 5,785,265 | 7/1998 | Rom et al. | 242/485.4 |

FOREIGN PATENT DOCUMENTS

| | | |
|---|---|---|
| 40 18 095 | 12/1991 | Germany . |
| 44 23 491 | 7/1994 | Germany . |
| 195 38 480 | 5/1997 | Germany . |
| WO 96/01222 | 1/1996 | WIPO . |

Primary Examiner—Donald P. Walsh
Assistant Examiner—Collin A. Webb
Attorney, Agent, or Firm—Alston & Bird LLP

[57] ABSTRACT

A method and apparatus for controlling a yarn winding machine, wherein a yarn is wound at a constant speed to a package on a driven winding spindle. A contact roll lies against the surface of the package. To enable an increasing package diameter, the center to center distance between the contact roll and the winding spindle is changed as a function of a variation in the rotational speed of the contact roll. To this end, the variation of the rotational speed of the contact roll is measured in each of a sequential series of predetermined time intervals T and converted into a control signal for changing the position of either the winding spindle or the contact roll.

20 Claims, 5 Drawing Sheets

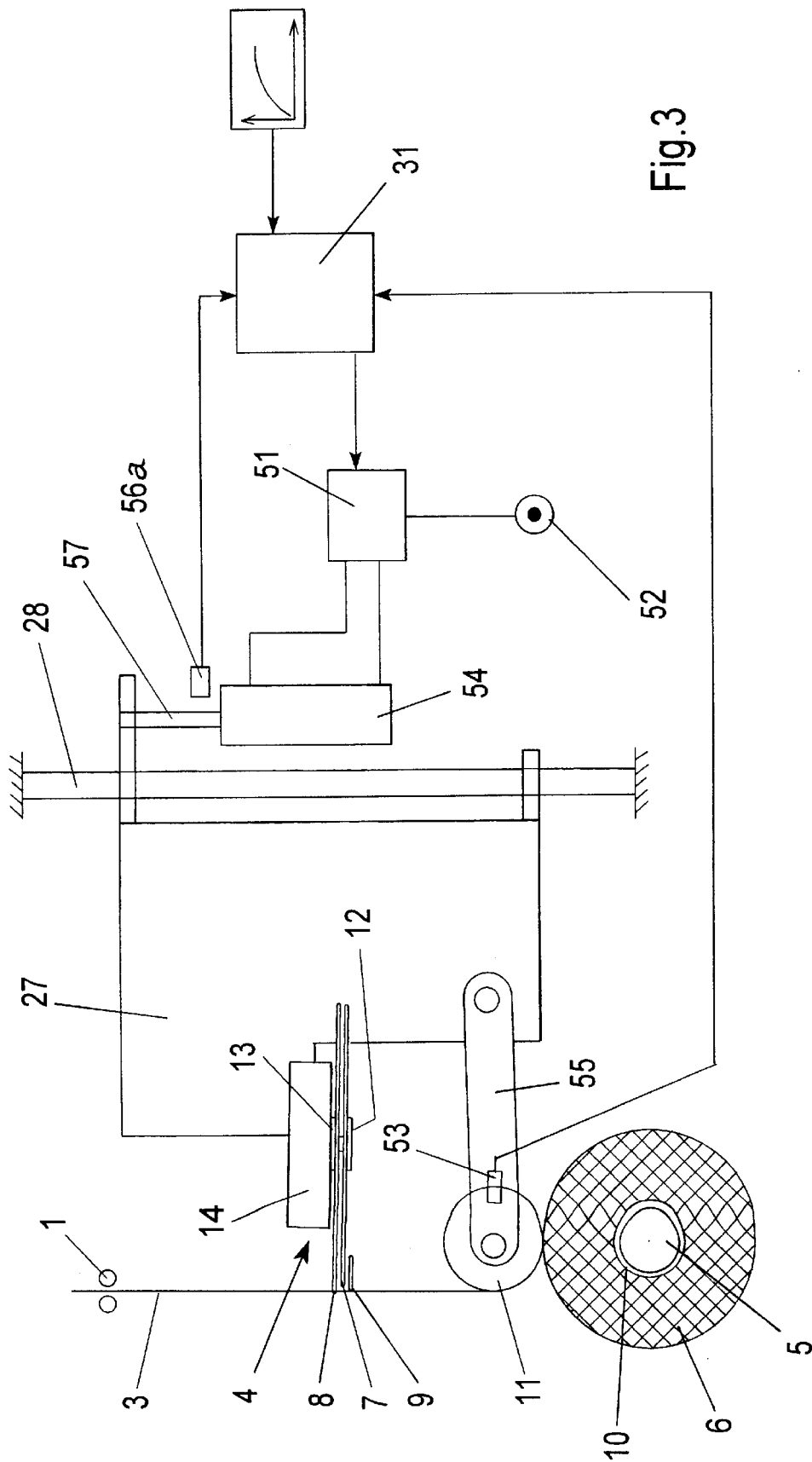

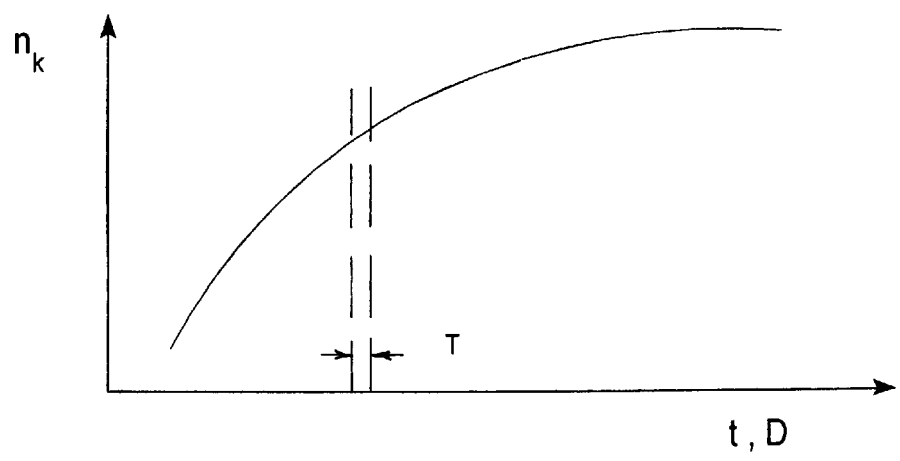
Fig.4.1
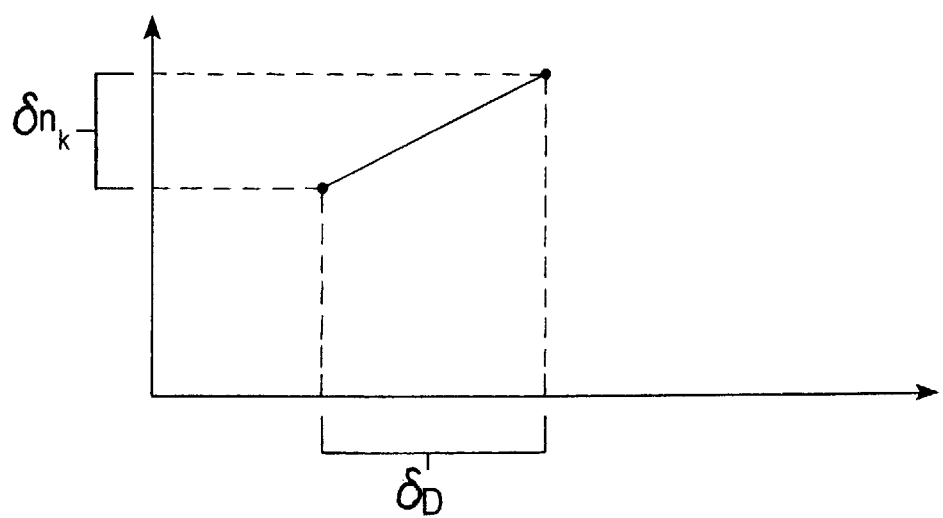
Fig.4.2

CONTROL METHOD AND APPARATUS FOR A YARN WINDING MACHINE

BACKGROUND OF THE INVENTION

The invention relates to a method and apparatus for controlling a yarn winding machine of the type wherein a continuously advancing yarn is wound on a tube to form a yarn package.

A yarn winding or takeup machine is known wherein at an increasing package diameter the distance between the axis of a contact roll and the axis of a winding spindle is enlarged by rotating a turret which mounts the winding spindle. Note for example, DE 40 18 095 and corresponding U.S. Pat. No. 5,100,072. In this known machine, the contact roll lies against the circumference of the package and is mounted such that it is able to perform during the winding operation a radially directed movement relative to the package surface. The lift of the contact roll is detected and supplied to a turret control, which activates a drive of the turret such that the contact roll maintains a predetermined desired position during the winding operation.

In the above method, the contact roll performs the movement of a pendulum about its desired position. Based on bearing tolerances as well as geometrical transmission ratios, a certain deflection of the contact roll is necessary to obtain a utilizable signal for controlling the journal drive.

It is the object of the present invention to detect the increase of the package diameter directly so as to permit a change in position of the winding spindle relative to the contact roll, without substantially changing the position of the winding spindle and the contact roll relative to each other.

A further object of the invention is to provide a simple and compact control system for a yarn winding machine.

SUMMARY OF THE INVENTION

The above and other objects and advantages of the present invention are achieved by a yarn winding method and apparatus of the described type which includes the steps of controlling the center to center distance between the winding spindle and the contact roll by monitoring the rotational speed of the contact roll, which is dependent on the package diameter, and changing the center to center distance in response to the monitored variation in the rotational speed of the contact roll. Preferably, the monitoring of the rotational speed of the contact roll occurs in each of a series of sequential predetermined time intervals T.

The invention would not have been suggested by the methods disclosed in DE 195 38 480 and WO 96/012222. More particularly, DE 195 38 480 discloses a method of controlling a yarn winding machine, wherein the momentary angular velocity is computed, at which a winding spindle support constructed as a turntable must be moved during the winding cycle, so as to accommodate the diameter increase of the package. In this instance, the angular velocity is computed from the yarn speed, the rotational speed of the winding spindle, and the package diameter.

WO 96/012222 discloses a further method of controlling a yarn winding machine, wherein the momentary angular position is computed which the turntable which supports the winding spindle must have at the momentary wound package diameter. In this instance, the angular position is computed from the rotational speed of the winding spindle, the rotational speed of the contact roll, and the package diameter.

Both of the above methods are based on the fact that the momentary rotational speed of the winding spindle is used to determine the speed or position of the winding spindle support. However, to maintain the yarn speed constant during the winding, it is necessary to adjust the winding spindle speed constantly. Having this in mind, the known methods have the disadvantage that the adjustment or control of the deflection for changing the center to center distance between the winding spindle and the contact roll is dependent on the adjustment of the winding spindle speed.

In comparison therewith, the present invention has the advantage that the change in position of the contact roll or the winding spindle is independent of the adjustment of the winding spindle speed. To determine the diameter increase, the variation in the rotational speed of the contact roll is determined in a predetermined time interval. This rotational speed variation $\delta n_k$ contains already all information for realizing a controlled change in position. An increase of the package diameter will immediately lead to a change in the rotational speed of the contact roll, when same is in contact with the package surface.

The rotational speed variation per unit time assumes different values as a function of the package diameter, thus providing a direct relationship between the rotational speed variation and the package diameter. At the beginning of the winding cycle, the known tube diameter is prestored. A relatively fast diameter change follows, which leads to a correspondingly fast variation in the rotational speed of the contact roll. In contrast thereto, a slow increase of the package diameter at the same unit time can be registered toward the end of the winding cycle. This leads to a correspondingly small variation in the rotational speed of the contact roll per unit time.

One special advantage of the invention lies in the fact that the diameter increase of the package is determined during the winding cycle with a high sensitivity. By predetermining the time interval with the time T, it is possible to make the steps for determining the rotational speed changes so small that the position change causes a continuous deflection of the winding spindle or the contact roll.

A further advantage of the invention lies in the special compact configuration of the control device of the winding machine.

In a particularly preferred embodiment of the method, an increase of the package diameter is computed, upon an increase in the rotational speed of the contact roll from the rotational speed variation $\delta n_k$, the rotational speed of the winding spindle, and the package diameter at the beginning of the time interval.

Subsequently, from the increase of the package diameter, an adjusting signal is generated for controlling a position change in the direction of enlarging the center to center distance between the contact roll and the winding spindle. Contrary thereto, when the rotational speed of the contact roll decreases, an adjusting signal will be directly generated for controlling the position change in the direction of reducing the center to center distance between the contact roll and the winding spindle. This ensures that a constant contact remains between the contact roll and the package surface. Thus, a contact force that is adjusted between the contact roll and the package will maintain essentially a predetermined course during the winding cycle, since the relative position between the contact roll and the package does not change substantially.

To obtain smallest possible deviations in the relative position between the contact roll and the package, it will be of advantage, when at a lowered rotational speed of the contact roll the position change is controlled such that the position is adjusted to the initial value of the position of the preceding time interval.

In a winding machine, wherein both the winding spindle and the contact roll are each mounted on a movable support, the variant of the method is especially advantageous by which the package diameter at the end of the time interval is computed from the variation of the rotational speed.

When the contact roll lies against the package surface, it is possible to exactly determine every position change by the geometrical arrangements on the winding machine. It is therefore possible to predetermine and adjust the association of the package diameter to an adjustable position.

In this instance it will be of advantage, when a desired function is prestored for the control, which indicates the geometrical relationship between the package diameter and the position of the contact roll or the position of the winding spindle.

Based on the computed package diameter, it is therefore possible to determine and adjust directly from the desired function the position that is to be adjusted.

In this the connection, the predetermined desired function may indicate both the relationship between the package diameter and the position of the contact roll or the position of the winding spindle, or it may even indicate the relationship between the package diameter increase and the position of the contact roll or the position of the winding spindle.

A further advantageous variant of the method offers the possibility of predetermining by computation the position that is controlled by the position change.

In this connection, the position is computed from the package diameter before the start of the time interval the package diameter increase, and the starting position of the contact roll or the winding spindle.

The method is suitable for any type of yarn winding machine, provided a low elasticity is present in the system of contact roll and winding spindle, so as to permit a small increase in the rotational speed of the contact roll.

In a winding machine with a stationary contact roll, it is therefore necessary that the winding spindle exhibit a certain elasticity, for example, by elastic bearings.

In this instance, the winding spindle may be mounted on a support, which extends in a linear guideway for changing the position. Likewise, it is possible to adjust by the same method a winding spindle on a driven spindle turret.

However, the method may also be used in winding machines, wherein the winding spindle remains during the winding cycle in a fixed position. In this instance, the contact roll is changed in its position by the movement of a roll support. This roll support may be supported in a linear guideway or be mounted for pivotal movement on the machine frame.

To ensure during the winding cycle that predetermined tolerances as regards contact force or distance of adjustment of the contact roll are maintained, a particularly advantageous variant of the method provides for adjustment of a position change, preferably at regular time intervals, by enlarging each time the center to center distance between the contact roll and the package, so that the rotational speed of the contact roll decreases. This ensures that the control of the position change assumes a characteristic of adjustment, since the reversal of movement of the position change leads each time to a readjustment between the contact roll and the spindle support. Thus, the control method can be used with advantage even in very complex sequences of motion.

BRIEF DESCRIPTION OF THE DRAWINGS

The invention is described in more detail with reference to the embodiments illustrated in the attached drawings, in which:

FIG. 3 is a further embodiment of a winding machine in accordance with the invention;

FIG. 4.1 is a diagram of the course of the uncontrolled rotational speed of the contact roll as a function of the package diameter;

FIG. 4.2 is a similar diagram illustrating the relationship between a change in rotational speed of the contact roll and the change in the package diameter;

DETAILED DESCRIPTION OF THE PREFERRED EMBODIMENTS

Figure 1:
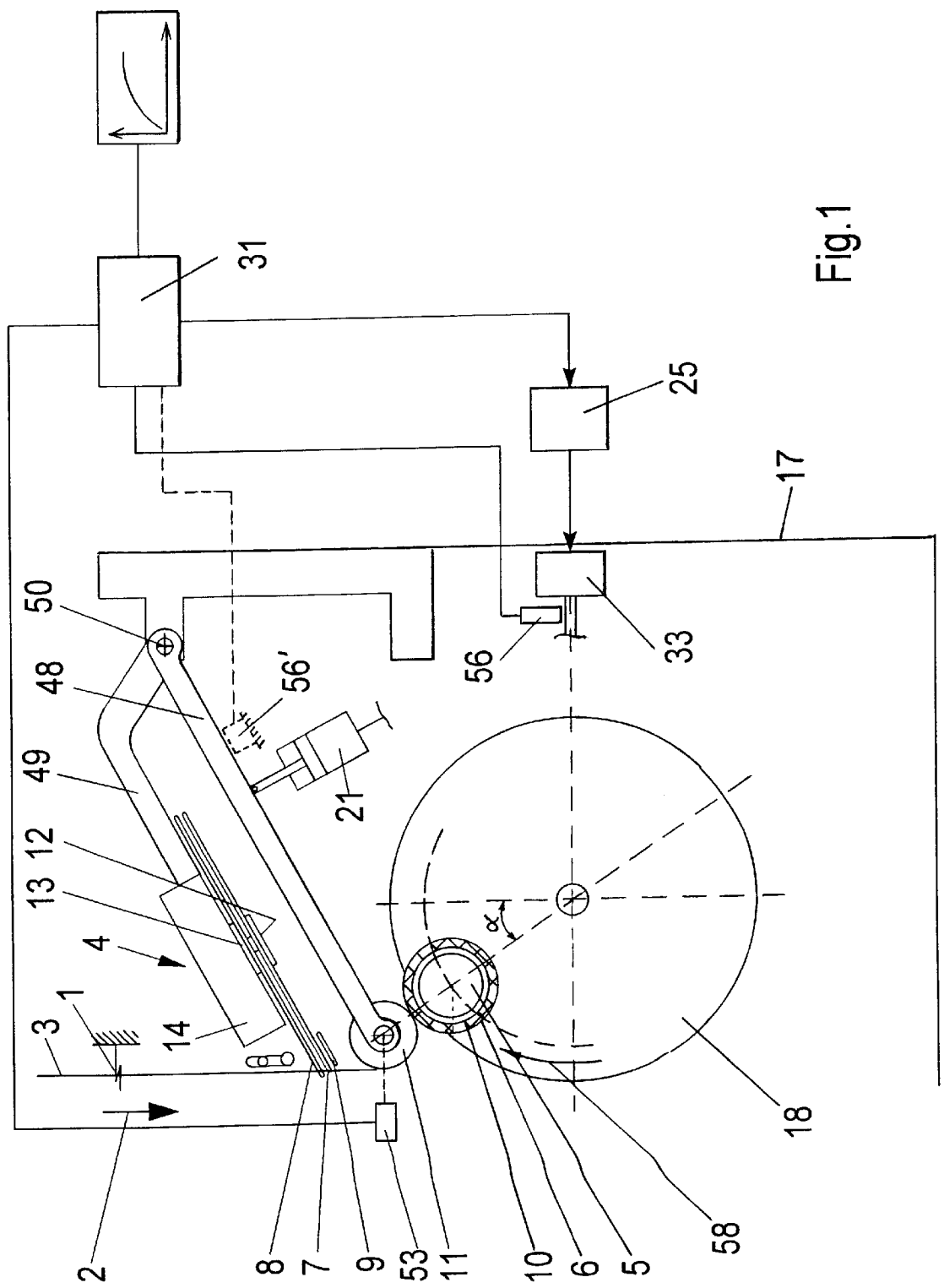
FIG. 1 is a side view of a first embodiment of a yarn winding machine in accordance with the invention.
Figure 2:
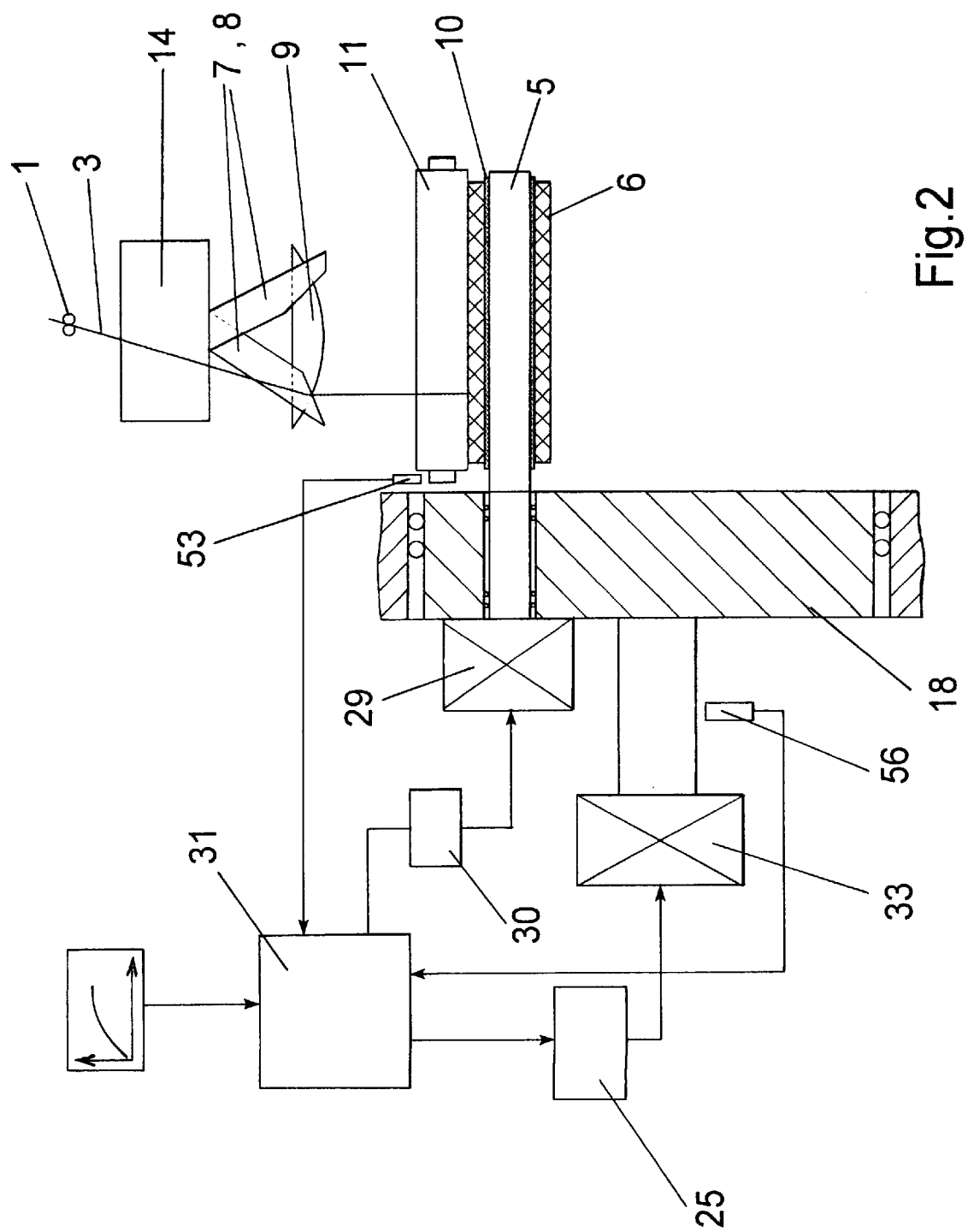
FIG. 2 is a front view of the winding machine of FIG. 1.

The following description applies to the embodiment of FIGS. 1 and 2.

A yarn 3 advances at a constant speed to the winding machine. Initially, the yarn 3 travels through a yarn guide 1 which forms the apex of a traversing triangle. Thereafter, as it advances in direction 2, the yarn reaches a traversing mechanism 4, which is described further below.

Downstream of the traversing mechanism, the yarn is deflected on a contact roll 11 by more than 90° and subsequently wound on a package 6. The package 6 is formed on a winding tube 10. The winding tube 10 is mounted on a freely rotatable winding spindle 5. The winding spindle 5 mounting winding tube 10 and the package 6 being formed on the latter is at the start of its operating position.

The winding spindle 5 is mounted off center for rotation about a rotatable spindle support or turret 18, and it is driven by an electric motor 29. The electric motor 29 is mounted in alignment with spindle 5 on spindle support 18, and it connects to an inverter 30. The inverter 30 is activated by a control device 31 which is activated by a rotational speed sensor 53 that senses the rotational speed of the contact roll 11. The control device 31 activates the inverter 30 of winding spindle 5 in such a manner that the rotational speed of contact roll 11 and, thus, likewise the surface speed of package 6 remain constant despite the increasing package diameter.

The spindle turret 18 is mounted for rotation in a frame 17 of the takeup machine, and it is rotated by a drive motor 33 in direction 58. The drive motor 33 is used to rotate the spindle turret 18 in a direction, so as to enlarge or reduce the center to center distance between the contact roll 11 and winding spindle 5 as the package diameter increases. The drive motor 33 is connected to an inverter 25. The inverter 25 is activated by control device 31. The control device 31 is connected to a position sensor 56 which determines the angular position of the spindle turret 18 relative to the machine frame.

As shown in FIG. 1, the contact roll 11 is mounted on a support 48 which is constructed as a rocker arm, so that the contact roll 11 is able to perform a movement in radial direction relative to the package. The rocker arm 48 is mounted in the machine frame for pivotal movement about an axis 50 which is formed by a rubber block. This rubber block is firmly secured in the machine frame, and it mounts the rocker arm 48, so that same can be pivoted in a rubber-elastic manner. This rubber-elastic support works like a spring which acts upon the rocker arm 48 in a direction of increasing the contact force.

A cylinder-piston unit 21 which is pneumatically biased and acts upon the rocker arm 48 from the bottom against the weight of the contact roll, permits adjustment of the contact force between the contact roll and the package.

In the embodiment of FIGS. 1 and 2, the yarn traversing mechanism is constructed as a so-called "rotary blade type traversing apparatus." It comprises two rotors 12 and 13, which are interconnected by a gearing (not shown) and driven by a motor 14. The rotors 12 and 13 mount rotary blades 8 and 7.

The rotors rotate in different directions. In do doing, they guide the yarn along a guide edge 9. One of the rotary blades guides the yarn in the one direction and then moves below the guide edge, while the other rotary blade assumes guidance in the other direction and subsequently moves below the guide edge. The yarn traversing mechanism 4 is mounted for movement in the frame of the takeup machine. To this end, a rocker arm 49 is used, which mounts on its one end the yarn traversing mechanism. At its other end, the rocker arm is supported for pivotal movement in such a manner that the yarn traversing mechanism is able to perform a movement perpendicular to itself and relative to the contact roll, namely a parallel displacement.

The operation of the winding machine is described in the following:

FIG. 1 shows the operation of winding spindle 5. Only few layers of yarn are wound on empty tube 10, and the contact roll 11 is in circumferential contact with the package 6 being formed.

As the package diameter becomes larger, the rotational speed of contact roll 11 increases. The rotational speed of the contact roll is detected by rotational speed sensor 53 and supplied to the control device 11. To this end, the control device 31 is coupled with a pulse transmitter (not shown) which predetermines a time interval T, while the rotational speed variation is being measured. With that, the speed change $\delta n_k$ is determined in the time interval T. Thereafter, the package diameter increase is determined from the rotational speed variation $\delta n_k$. To this end, the control device 31 receives a desired function, which defines the package diameter increase over the time of the winding cycle. Based on the geometrical dependencies among the position of the contact roll, the position of the winding spindle, and the package diameter, each point of time of the winding cycle is defined by a certain position of the winding spindle and the contact roll. The position sensor 56 supplies to the control device 31 the momentary position of the spindle turret 18. Thus, the control device 31 is in a position to compute from the determined value of the package diameter increase $\delta D$ an adjustment signal for controlling the position change of the winding spindle. The signal is supplied to inverter 25, which activates the drive motor 33, so that the spindle turret 18 is able to occupy the selected position in a clockwise direction.

In the event that the rotational speed variation of the contact roll is signaled as a decrease of the contact roll speed, the control device 31 will directly generate an adjustment signal, which causes the drive motor 33 to rotate the spindle turret counterclockwise, namely oppositely to the direction of rotation 58, until the spindle turret 18 assumes the position, which it had occupied before the start of the preceding time interval.

During the winding, the rotational speed of the contact roll 11 is continuously measured by sensor 53. At the same time, the control device 31 assumes the control of the winding spindle drive. In so doing, the rotational speed of the contact roll 11 as measured after each time interval is compared with the desired rotational speed of the contact roll. The control device 31 activates inverter 30, so as to readjust the winding spindle drive 29 such that the contact roll which is driven by the package surface, reaches its desired speed.

In the embodiment of FIGS. 1 and 2, the position sensor 56 is used to determine the momentary position of the spindle turret 18 and to supply same to the control device 31. However, it is also possible to arrange a position sensor in the region of rocker arm 48 mounting contact roll 11, as shown in dashed lines in FIG. 1. In this instance, the position sensor 56' registers the position of rocker arm 48. This embodiment will be of advantage, when the increasing diameter is determined during a phase of the winding cycle by a deflection of the contact roll 11. In this phase, the spindle turret 18 is inoperative. The rocker arm 48 is moved by the cylinder piston unit 21. To this end, an activation of the piston-cylinder unit is provided by the control device 31.

The position of the spindle turret 18 and likewise the position of the rocker arm 48 can advantageously be determined by a position sensor that is constructed as an angle sensing element. However, to exactly determine and control the positions of the contact roll 11 and the winding spindle 5, it is prerequisite that the contact roll be constantly in a circumferential contact with the package 6.

For a continuous winding of a yarn, the winding machine of FIGS. 1 and 2 may also have a second winding spindle, mounted about 180° out of phase. Once a full package is wound on one of the winding spindles, the second winding spindle is rotated by the winding spindle support or turret to the operating position, and after a transfer, winding of the yarn can continue.

Figure 5:
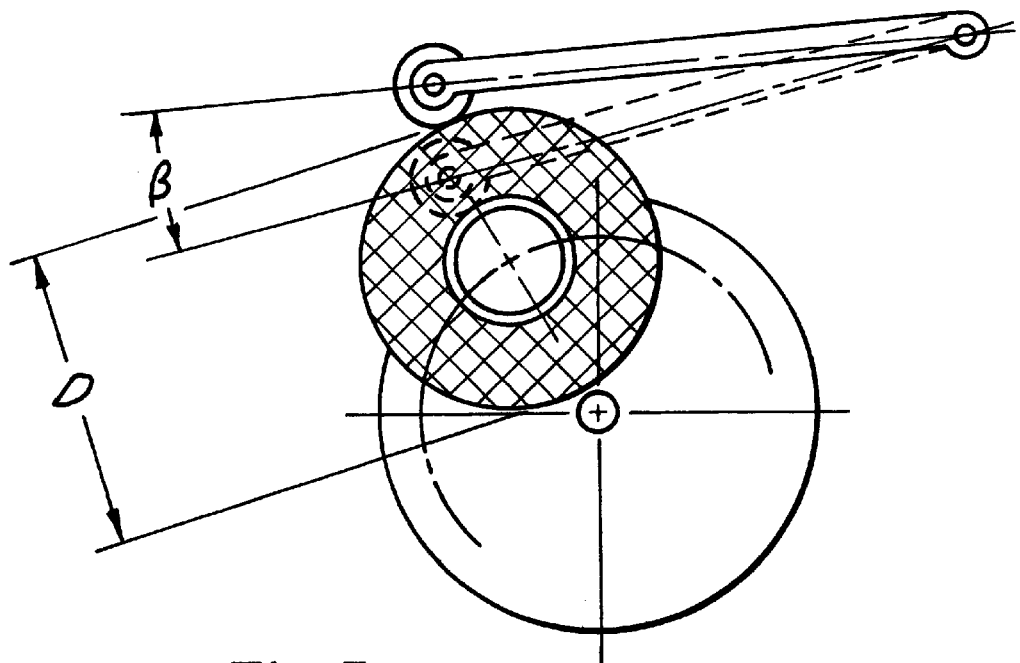
FIG. 5 is a schematic diagram similar to FIG. 1 and illustrating the positions of the contact roll when the winding spindle is fixed.
Figure 6:
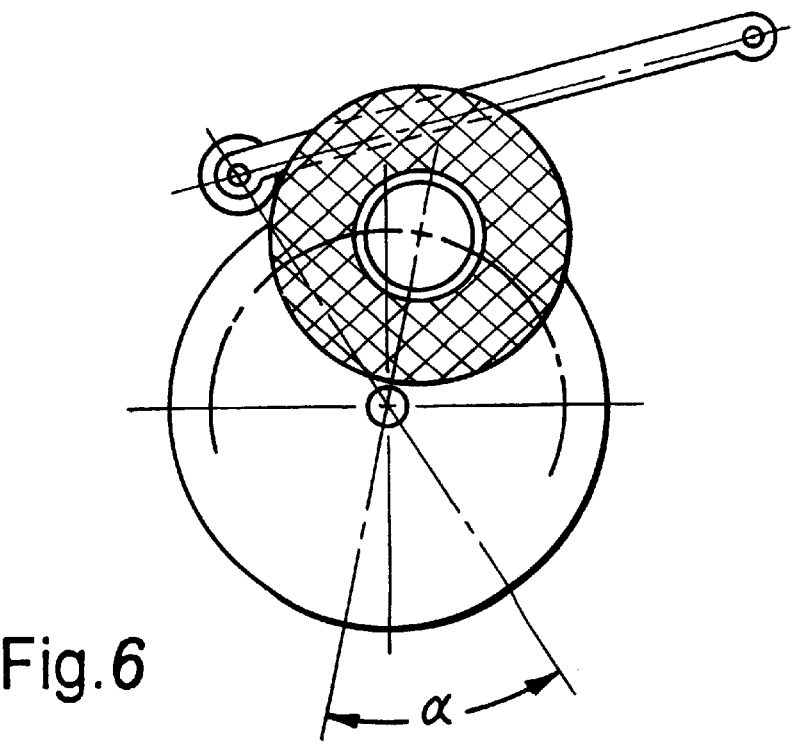
FIG. 6 is a view similar to FIG. 5 and illustrating the positions of the winding spindle when the contact roll is fixed.

The positions of the contact roll and the winding spindle are dependent on the geometry of the winding machine and the package diameter, as illustrated in FIGS. 5 and 6. If the position of the winding spindle is fixed (FIG. 5), then the position of the contact roll depends on the predetermined function tan β~D/2, wherein β is the pivot angle of the contact roll and D is the package diameter. If the position of the contact roll is fixed (FIG. 6), then the position of the winding spindle depends on a predetermined function cos α~D/2, wherein a is the pivot angle of the winding spindle. Therefor every package diameter defines a predetermined position of the contact roll and the winding spindle.

FIG. 3 shows a further embodiment of a takeup machine in accordance with the invention. In this Figure, identical functional elements are indicated by the same numerals.

In comparison with the embodiment of FIGS. 1 and 2, the winding spindle 5 of this winding machine remains unchanged in its position during the winding cycle.

A winding spindle support (not shown) of this embodiment may be a linear guideway or a rocker arm or a spindle turret. Thus, the position of the contact roll is changed during the winding cycle. To this end, the contact roll 11 is mounted for rotation on a bracket 55. The bracket 55 is arranged on a support constructed as a carriage 27. The carriage 27 is mounted for vertical adjustment on a guideway 28. In the direction of the advancing yarn, upstream of the contact roll, the yarn traversing mechanism 4 is mounted on carriage 27. A linear drive 54 engages on carriage 27. The linear drive 54 is connected via a piston rod 57 to carriage 27, and activated via a control valve 51. The control valve 51 is connected to a source of pressure 52. The control valve 51 is coupled with a control device 31. The control device 31 receives the rotational speed signals of the contact roll by means of a speed sensor 53. Likewise, the position of carriage 27 is determined via the position sensor 56a and supplied to the control device 31.

The yarn 3 advances to the winding machine via the yarn guide 1. After the yarn has passed through the traversing mechanism 4, the yarn contacts contact roll 11, and it is then deposited on the package 6. In so doing, the yarn partially loops about the contact roll 11. The yarn traversing mechanism is constructed as a rotary-blade type traversing apparatus. In this respect, the description of FIG. 1 is herewith incorporated by reference.

However, it is also possible to construct the yarn traversing mechanism as a so-called "cross-spiralled roll type traversing apparatus." In this instance, a traversing yarn guide is guided in a groove of a cross-spiralled roll.

As the diameter of package 6 increases, the rotational speed of the contact roll will vary. This variation is detected via rotational speed sensor 53 and supplied to the control device 31. The control device determines the varied rotational speed of the contact roll per predetermined unit time T.

From the change of the rotational speed $\delta n_k$, the package diameter at the start of the time window, as well as the spindle speed, the control device computes the momentary diameter of package 6.

Based on a prestored desired function that indicates the relationship between the height of the carriage and the package diameter, a desired position of carriage 27 is determined. The momentary actual position of carriage 27 is supplied to the control device 31 via position sensor 56a. Thus, the control device 31 generates an adjustment signal, which is supplied to control valve 51 for controlling linear drive 54. The carriage 27 is now moved by linear drive 54 to its desired position.

Likewise, the speed adjustment of winding spindle 5 is simultaneously carried out by the control device 31. The procedure is identical with that of the embodiment of FIGS. 1 and 2. To this extent, the description of FIGS. 1 and 2 is herewith incorporated by reference.

FIG. 4.1 illustrates a diagram which shows the uncontrolled course of rotational speed $n_k$ of the contact roll. Without control, the rotational speed of the contact roll would increase hyperbolically with the increasing package diameter, i.e., in the region of smaller package diameters the curve has a greater slope than in the region of larger package diameters. By the slope of this curve which is characterized by the ratio $\delta n_k$ to $\delta D$, each point of time of the winding cycle may be exactly defined. Thus, it is possible to compute the diameter increase solely from the variation of the rotational speed of the contact roll.

From the diameter increase $\delta D$, it is possible to compute respectively the associated package diameter, since the initial diameter is predetermined by the diameter of the winding tube.

The time interval T is supplied to the control device via a pulse transmitter. The time may be determined such as to permit an almost continuous deflection of the contact roll or winding spindle. The time interval may be in a range of 15 ms.

For the application of the method it will be irrelevant which support mounts and guides the contact roll or the winding spindle.

To prevent in such a control method the contact force from increasing in the case of a too small deflection of the contact roll or the winding spindle, it is possible to superimpose the control with an overriding control cycle. In this instance, the position change of the contact roll or the winding spindle is deliberately overridden in a predetermined cycle, so that in a subsequent time window the rotational speed of the contact roll is lowered. This ensures that the relative position between the contact roll and the package is substantially maintained during the entire winding cycle.

As indicated above, the rotational speed control of the package provided by the sensor 53 and the control device 31 serves to maintain a substantially constant surface speed on the package and thus a substantially constant yarn winding speed. This control is preferably superimposed with the center to center spacing control of the present invention. The diagram of FIG. 4.1 shows the curve of an uncontrolled rotational speed of the contact roll ($n_k$) to illustrate that the change of the rotational speed of the contact roll ($\delta n_k$) is dependent on the yarn package diameter. Therefore, the change of rotational speed of the contact roll ($\delta n_k$) can be used to control the position of the winding spindle or the contact roll. In actual practice, the rotational speed of the contact roll ($n_k$) is preferably controlled, so that the change of rotational speed of the contact roll ($\delta n_k$) only briefly occurs during the center to center spacing control of the present invention.

That which is claimed is:

1. A method of winding a continuously advancing yarn to form a yarn package, comprising the steps of
    winding the advancing yarn onto a tube which is coaxially mounted on a driven winding spindle and so as to form a yarn package,
    measuring the surface speed of the package by means of a contact roll which is positioned to lie against the surface of the package, and
    controlling the center to center distance between the winding spindle and the contact roll to accommodate the increasing diameter of the package and including monitoring a variation in the rotational speed of the contact roll in a predetermined time interval T, and changing the center to center distance in response to a monitored variation in the rotational speed of the contact roll.

2. The method as defined in claim 1 wherein the controlling step includes monitoring the rotational speed of the contact roll in each of the series of sequential time intervals and changing the center to center distance in response to a monitored variation in the rotational speed in each of the time intervals.

3. The method as defined in claim 2 wherein the controlling step further includes, in the case of an increasing rotational speed of the contact roll,
    computing a diameter increase of the package from the increase of the rotational speed, the rotational speed of the winding spindle, and the package diameter at the beginning of the time interval, and
    generating an adjustment signal from the package diameter increase for enlarging the center to center distance, and in the case of a decreasing rotational speed
    generating an adjustment signal for reducing the center to center distance.

4. The method as defined in claim 3 wherein the step of generating an adjustment signal for reducing the center to center distance includes controlling the center to center distance such that the distance is set to an initial value of the distance of the preceding time interval.

5. The method as defined in claim 2 wherein the controlling step includes computing the package diameter at the end of each time interval, and utilizing the computed package diameter as the initial value of the package diameter for the subsequent time interval.

6. The method as defined in claim 2 wherein during a center to center distance change, a final distance is selected which is determined from a predetermined desired function that indicates the relationship between the package diameter increase and the position of the contact roll or the position of the winding spindle.

7. The method as defined in claim 2 wherein during a center to center distance change, a final distance is selected which is computed from the package diameter before the start of the time interval, the package diameter increase, and the starting position of the contact roll or the winding spindle.

8. The method as defined in claim 2 wherein during the winding cycle, a center to center distance change is adjusted at predetermined time intervals in a direction of enlarging the center to center distance between the contact roll and the winding spindle, with the rotational speed of the contact roll decreasing during this position change.

9. The method as defined in claim 2 comprising the further steps of monitoring the rotational speed of the winding spindle and the package, and adjusting such rotational speed so that the advancing yarn is wound at a substantially constant speed onto the package.

10. The method as defined in claim 1 wherein during a center to center distance change, a final distance is selected which is determined from a predetermined desired function that indicates the geometrical relationship between the package diameter and the position of the contact roll or the position of the winding spindle.

11. The method as defined in claim 10 wherein the contact roll or the winding spindle is moved by a driven pivotal support, the position of the contact roll or the winding spindle being defined by an angular position of the support.

12. The method as defined in claim 10 wherein the contact roll or the winding spindle is moved by a linearly driven support, the position of the contact roll or the winding spindle being defined by a vertical position of the support.

13. An apparatus for winding a continuously advancing yarn to form a yarn package, comprising a winding spindle adapted for coaxially receiving a tube upon which the yarn package is wound, a contact roll mounted so as to lie in contact with the surface of the package, means mounting the winding spindle and contact roll so as to permit the center to center distance therebetween to be varied, a sensor for determining a variation in the rotational speed of the contact roll in a predetermined time interval T, and a control device for varying the center to center distance in response to a signal from the sensor.

14. The apparatus as defined in claim 13 wherein the control device includes a position sensor for determining the momentary position of the contact roll or the winding spindle.

15. The apparatus as defined in claim 14 further comprising a drive for rotating the winding spindle, said drive being controlled by a signal from said sensor so as to control the rotational speed of the package.

16. The apparatus as defined in claim 15 wherein the winding spindle is mounted on a moveable spindle support, and wherein the control device acts to vary the position of the moveable spindle support.

17. The apparatus as defined in claim 15 wherein the contact roll is mounted on a moveable roll support, and wherein the control device acts to vary the position of the moveable roll support.

18. The apparatus as defined in claim 17 wherein the moveable roll support comprises a pivotal rocker arm which is supported on a machine frame.

19. The apparatus as defined in claim 15 wherein the control device includes a pulse transmitter which generates a series of sequential time intervals, and wherein the sensor monitors the change in rotational speed of the contact roll and signals the control device during each of the time intervals.

20. The apparatus as defined in claim 16 wherein the moveable spindle support comprises a turret mounted for rotation about an axis parallel to but laterally offset from the axis of the winding spindle.

* * * * *